(12) United States Patent
Masuda et al.

(10) Patent No.: US 7,742,865 B2
(45) Date of Patent: Jun. 22, 2010

(54) DRIVING FORCE CONTROL UNIT FOR A VEHICLE

(75) Inventors: Toshio Masuda, Tokyo (JP); Kenichi Yamamoto, Tokyo (JP); Kenji Hijikata, Tokyo (JP); Satoshi Satomura, Tokyo (JP); Hiroshi Oishi, Tokyo (JP); Toyohide Sunaguchi, Tokyo (JP); Yoshio Iwakami, Tokyo (JP); Munenori Homma, Tokyo (JP); Atsushi Atake, Tokyo (JP); Kouji Kaneda, Tokyo (JP); Tatsuru Fukuda, Tokyo (JP); Minoru Yuki, Tokyo (JP); Masayuki Ushiki, Tokyo (JP); Tsuyoshi Kobayashi, Tokyo (JP); Masahito Motoi, Tokyo (JP); Naoki Shibata, Tokyo (JP); Hiroshi Ogiwara, Tokyo (JP); Katsumasa Igarashi, Tokyo (JP); Junzo Shinozuka, Tokyo (JP); Akihisa Nakamura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 564 days.

(21) Appl. No.: 11/783,267

(22) Filed: Apr. 6, 2007

(65) Prior Publication Data

US 2008/0015767 A1 Jan. 17, 2008

(30) Foreign Application Priority Data

Apr. 7, 2006 (JP) ............... 2006-106146
May 19, 2006 (JP) ............... 2006-140754
Jun. 27, 2006 (JP) ............... 2006-177200

(51) Int. Cl.
*G06F 19/00* (2006.01)

(52) U.S. Cl. ............... 701/99; 701/54; 701/55; 701/110; 477/7; 477/15; 477/34; 477/107; 477/115

(58) Field of Classification Search ............ 701/54, 701/55, 56, 101, 110, 51; 477/3, 7, 14, 15, 477/17, 18, 20, 34, 43, 79, 80, 89–91, 107, 477/120
See application file for complete search history.

(56) References Cited

U.S. PATENT DOCUMENTS 5,247,859 A * 9/1993 Agusa et al. ............... 477/129

(Continued)

FOREIGN PATENT DOCUMENTS

| JP | 2003-211996 | 7/2003 |
|----|-------------|--------|
| JP | 2005-141999 | 6/2005 |
| JP | 2005-188384 | 7/2005 |

OTHER PUBLICATIONS

JP 2000-087772 Translation.*
JP 2003-211996 Translation.*
Japanese Office Action dated Aug. 1, 2006.

*Primary Examiner*—Thomas G Black
*Assistant Examiner*—Ce Li
(74) *Attorney, Agent, or Firm*—McGinn IP Law Group PLLC

(57) ABSTRACT

The driving force control unit comprises a plurality of control modes for controlling a driving force, each of control modes having each driving force characteristic; a vehicle driving condition detecting unit for detecting a vehicle driving condition; a selector for selecting one control mode from the plurality of control modes; a driving force setting unit for setting a driving force indication value according to the driving force characteristic selected by the selector based on the vehicle driving condition; and a shift lever position detector for detecting a shift lever position of a transmission. The control mode includes a reverse control mode having a reverse driving force characteristic suitable for traveling the vehicle in reverse direction. The driving force setting unit changes the control mode to the reverse control mode when the shift lever is detected in a position of a reverse range, and sets the driving force indication value according to the reverse driving force characteristic.

4 Claims, 12 Drawing Sheets

U.S. PATENT DOCUMENTS

| | | | |
|---|---|---|---|
| 5,337,239 A * | 8/1994 | Okuda | 701/55 |
| 5,841,201 A * | 11/1998 | Tabata et al. | 290/40 C |
| 6,909,953 B2 * | 6/2005 | Joe et al. | 701/51 |
| 2003/0078134 A1 * | 4/2003 | Kojima et al. | 477/3 |
| 2003/0229437 A1 * | 12/2003 | Joe et al. | 701/51 |
| 2007/0149350 A1 * | 6/2007 | Anderson et al. | 477/54 |

* cited by examiner

DRIVING FORCE CONTROL UNIT FOR A VEHICLE

CROSS REFERENCE TO RELATED APPLICATIONS

The disclosures of Japanese Applications No. 2006-106146 filed on Apr. 7, 2006, No. 2006-140754 filed on May 19, 2006 and No. 2006-177200 filed on Jun. 27, 2006 including the specification, drawings, and abstract are incorporated herein by references in its entirety.

BACKGROUND OF THE INVENTION

1. Technical Field

The present invention relates to a driving force control unit for a vehicle which selects one driving force characteristic from a plurality of different driving force characteristics by manipulation (outside operation) and determines driving force based on the selected driving force characteristic.

2. Related Art

Conventionally, in an engine with a so-called electronically controlled throttle in which a throttle valve is electronically controlled using a throttle actuator, an accelerator pedal and the throttle valve are not mechanically linked and hence, opening of the throttle valve (throttle opening) can be controlled with nonlinear characteristic with respect to an operation amount of the accelerator pedal (accelerator opening).

For example, publication of unexamined patent application JP A 2005-188384 discloses a technology in which an operation state of an engine is divided into a plurality of operation regions based on an engine rotational speed and accelerator opening and a map is set for each operation region to perform control of the throttle valve conforming to the operation state of the engine.

According to the technology disclosed in this reference, excellent driving performance is obtained by increasing potential to the maximum at the time of high-speed running, and driving with reduced power is attained when stopping and running are repeated in such cases as traffic congestion. Thus, excellent drivability can be achieved.

According to the technology shown in the above reference, the driving force characteristic is changed according to the accelerator pedal operation even if the vehicle travels reverse direction.

However, in the reverse traveling, a driver drives the vehicle based on a delicate accelerator pedal manipulation and steering manipulation with improperly attitude by paying attention around the vehicle. For this reason, if the driving range is changed according to the accelerator pedal operation, the accelerator pedal feeling is changed so that the driver feels uncomfortable feeling because the vehicle behavior is changed from the driver's assumption.

SUMMARY OF THE INVENTION

Accordingly, it is an object of the invention to provide a driving force control unit a vehicle capable of driving the vehicle in reverse direction with a constant accelerator pedal feeling without changing the driving range according to the accelerator pedal operation in traveling reverse direction.

The first aspect of this invention has a plurality of control modes for controlling a driving force, each of control modes having each driving force characteristic; a vehicle driving condition detecting unit for detecting a vehicle driving condition; a selector for selecting one control mode from said plurality of control modes; a driving force setting unit for setting a driving force indication value according to said driving force characteristic selected by said selector based on said vehicle driving condition; and a shift lever position detector for detecting a shift lever position of a transmission; said control mode including a reverse control mode having a reverse driving force characteristic suitable for traveling the vehicle in reverse direction, said driving force setting unit changes said control mode to said reverse control mode when said shift lever is detected in a position of a reverse range, and sets the driving force indication value according to said reverse driving force characteristic.

According to a second aspect of this invention according to the first aspect of this invention, said control mode includes a first mode having a normal driving force characteristic suitable for normal driving, and a second mode having a suppressed driving force characteristic, said first control mode is set as said reverse control mode.

According to a third aspect of this invention according to the first aspect of this invention, said control mode includes a first mode having a normal driving force characteristic suitable for normal driving, and a second mode having a high response driving force characteristic with respect to operation amount of an accelerator pedal, said first control mode is set as said reverse control mode.

Furthermore, a fourth aspect of this invention according to the first aspect of this invention, said driving force control unit changes the control mode to previous selected control mode from said reverse control mode when said shift lever is changed from reverse range to other ranges.

PREFERRED EMBODIMENTS OF THE INVENTION

Figure 1:
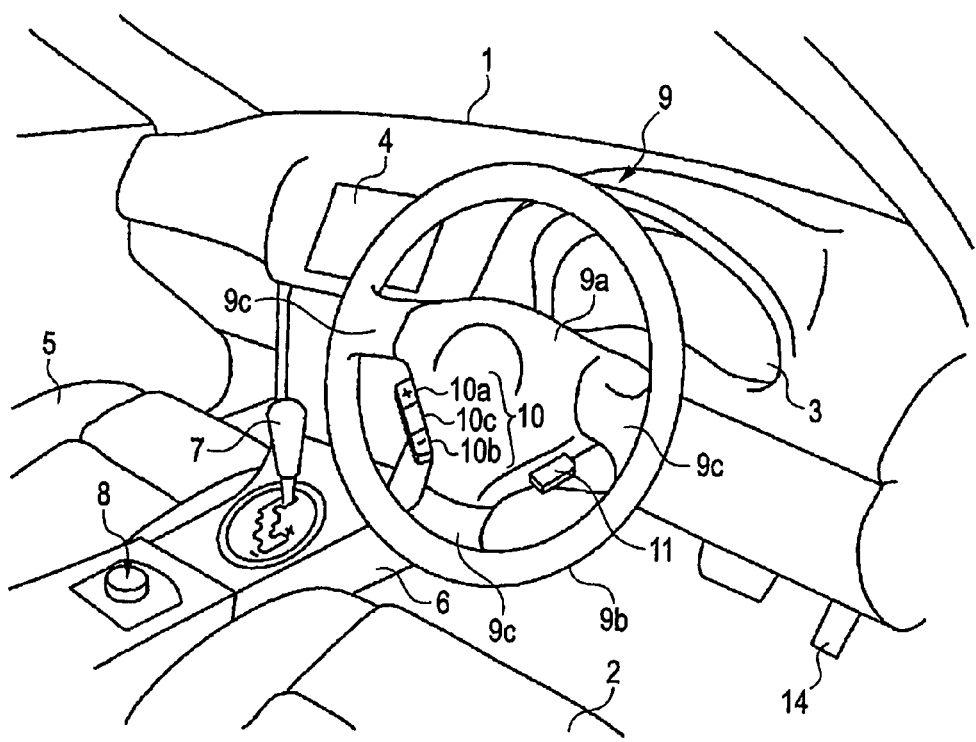
FIG. 1 is a perspective view of an instrument panel and a center console as viewed from a driver's seat side.

Hereinafter, first and second embodiments of the invention are explained in conjunction with drawings. FIG. 1 shows a perspective view of an instrument panel and a center console as viewed from a driver's seat side.

First Embodiment

As shown in FIG. 1, the instrument panel 1 which is arranged in a front portion in the inside of a cabin of a vehicle extends laterally in the vehicle width direction, and a combination meter 3 is arranged on the instrument panel 1 which is positioned in front of a driver's seat 2. Further, at the substantially center of the instrument panel 1 in the vehicle width direction, a center display 4 which is used as a display means constituting a well-known car navigation system is arranged.

Further, on a center console 6 which is arranged between the driver's seat 2 and a passenger seat 5 and extends toward a rear side of a vehicle body from the instrument panel 1 side, a selection lever 7 which is used to select a range of an automatic transmission is arranged, and a mode selection switch 8 which is used as a selection means for selecting driving force characteristic of an engine is arranged behind the selection lever 7. Further, a steering wheel 9 is arranged in front of the driver's seat 2.

The steering wheel 9 includes a center pad portion 9a which houses an air bag or the like, and the center pad portion 9a and left, right and lower portions of a grip portion 9b which is arranged around the center pad portion 9a are connected with each other by way of 3 spokes 9c. A display changeover switch 10 which is used as a display changeover means is arranged on a left lower portion of the center pad portion 9a. Further, a temporarily changeover switch 11 which is used as a temporarily changeover means is arranged on a right lower portion of the center pad portion 9a.

Figure 2:
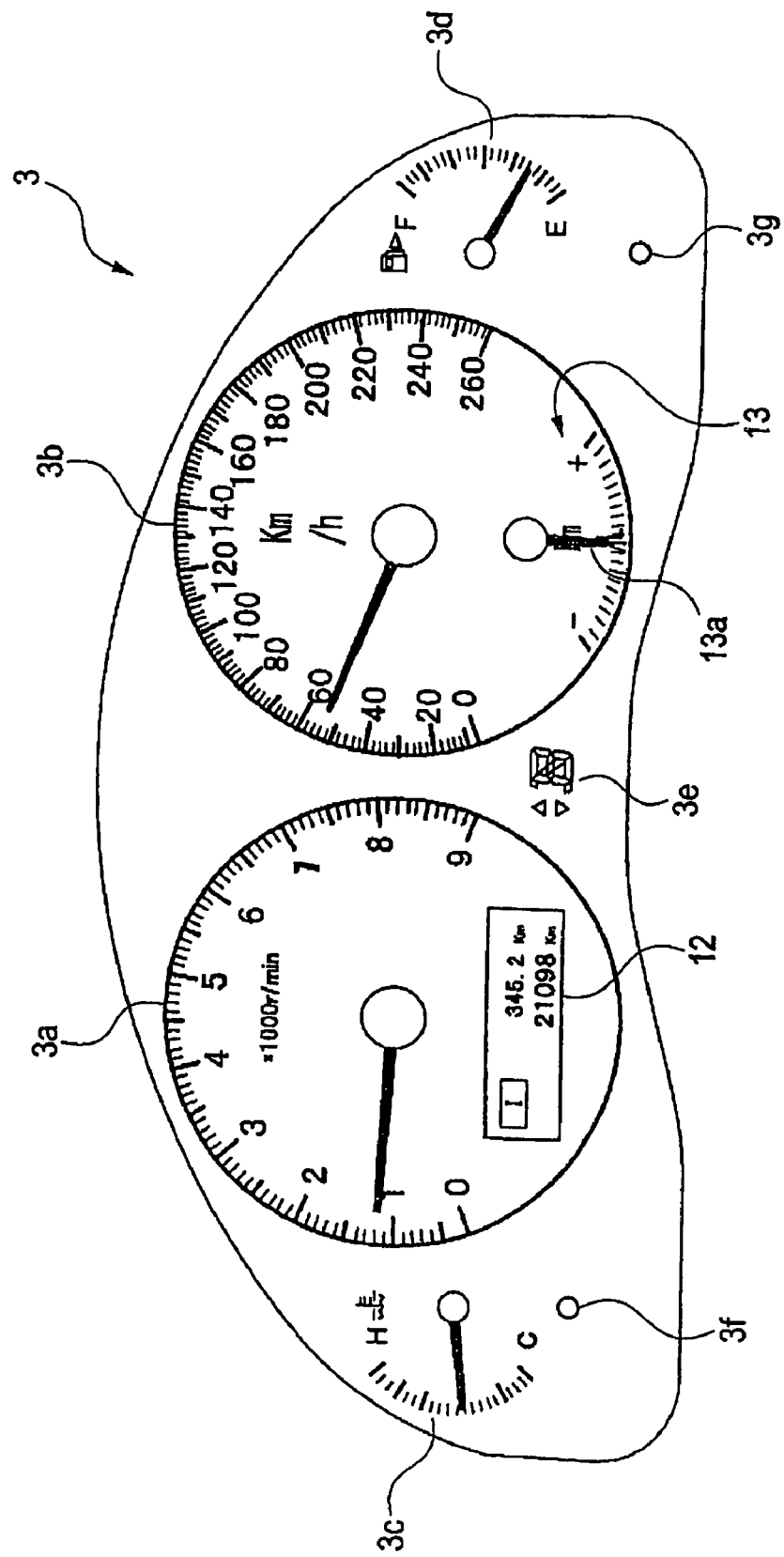
FIG. 2 is a front view of a combination meter.

Further, as shown in FIG. 2, on left and right sides of the combination meter 3 close to the center, a tachometer 3a which indicates an engine rotational speed and a speed meter 3b which indicates a vehicle speed are respectively arranged. Further, a water temperature meter 3c which indicates a cooling water temperature is arranged on the left side of the tachometer 3a, and a fuel level meter 3d which indicates residual fuel quantity is arranged on the right side of the speed meter 3b. Further, a gearshift position display portion 3e which indicates a current position of gearshift is arranged on a center portion of the combination meter 3. Here, symbol 3f indicates a warning lamp, and symbol 3g indicates a trip reset switch which resets a trip meter. A push button of the trip reset switch 3g projects toward the driver's seat 2 side from the combination meter 3, and the trip meter is reset when the driver or the like continuously turns on the trip reset switch 3g for a predetermined time or more by pushing the push button.

Further, on a lower portion of the tachometer 3a, a multi information display (hereinafter, abbreviated as "MID") 12 which is used as a display means for respectively displaying information such as mileage, fuel consumption, the engine driving force by changing over a plurality of display images is arranged. Further, on a lower portion of the speed meter 3b, a fuel consumption meter 13 which indicates a state of fuel efficiency based on the difference between the instantaneous fuel consumption and the trip average fuel consumption is arranged.

Figure 3:
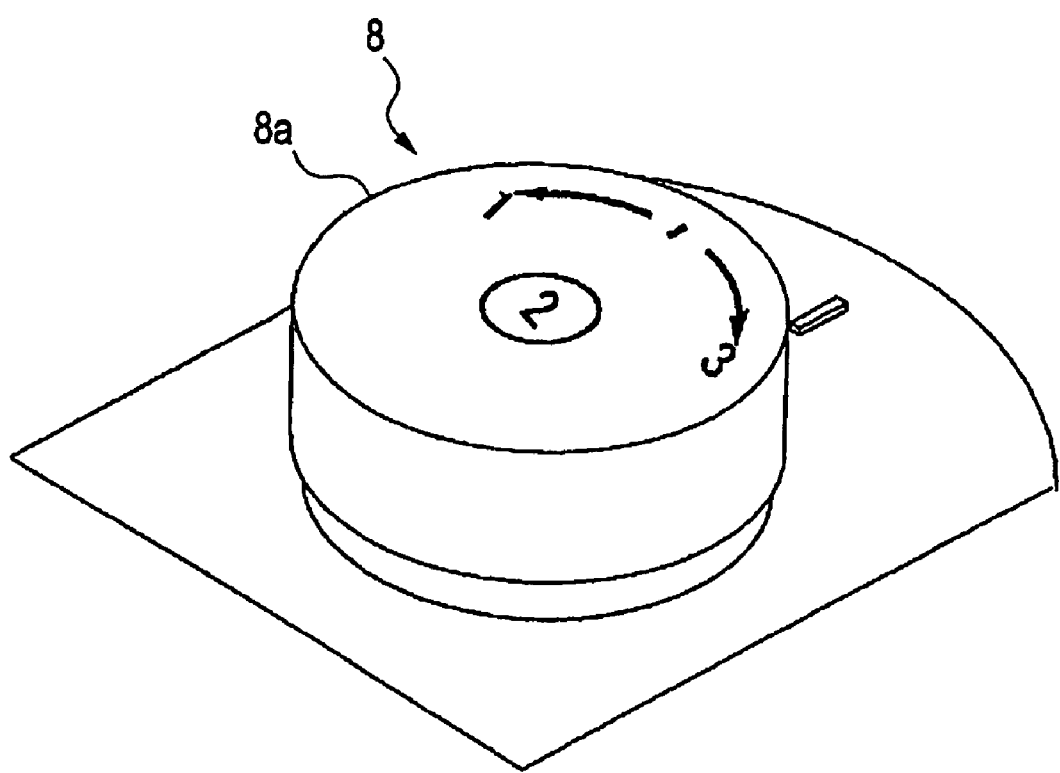
FIG. 3 is a perspective view of a mode selection switch.

Further, as shown in FIG. 3, the mode selection switch 8 is a shuttle switch which arranges a push switch parallel thereto. When an operator (since the operator is generally the driver, the explanation is made by referring the operator as "driver" hereinafter) manipulates a manipulation knob 8a, the driver can select three kinds of modes described later (a normal mode 1 which is a first mode, a save mode 2 which is a second mode, and a power mode 3 which is a third mode). That is, in this embodiment, by rotating the manipulation knob 8a in the left direction, a left switch is turned on and the normal mode 1 is selected. By rotating the manipulation knob 8a in the right direction, a right switch is turned on and the power mode 3 is selected. On the other hand, by pushing the manipulation knob 8a in the lower direction, the push switch is turned on and the save mode 2 is selected. Here, by allocating the save mode 2 to the push switch, even when the push switch is turned on erroneously during traveling, for example, the mode is just changed over to the save mode 2 where an output torque is suppressed as described later, hence there is no possibility that the driving force is acutely increased thus ensuring the safe driving of the driver.

Here, output characteristics of the respective modes 1 to 3 are briefly explained. The normal mode 1 is set such that an output torque is changed approximately linearly with respect to a operation amount of the accelerator pedal 14 (accelerator opening degree) (see FIG. 11A). The normal mode 1 is a mode which is suitable for normal driving.

Further, the save mode 2 is set as a mode in which by saving an engine torque alone or by saving an engine torque in synchronism with a lock-up control in case of an automatic transmission, smooth output characteristic is obtained while ensuring a sufficient output thus allowing a driver to enjoy the acceleration work. Further, in the save mode 2, the output torque is suppressed and hence, it is possible to achieve both of the easy drive ability and low fuel consumption (economical efficiency) in a well balanced manner. Further, for example, even in case of a vehicle with a 3 litter engine, the smooth output characteristic is obtained while ensuring a sufficient output corresponding to the 2 litter engine. Particularly, the easy-to-drive performance is achieved in a practical-use region such as traveling in towns.

The power mode 3 is set as a mode in which the output characteristics with an excellent response from a low speed region to a high speed region of the engine is achieved and, at the same time, in case of an automatic transmission, a shift-up point is changed in accordance with engine torque, hence the vehicle can cope with a sporty or zippy driving on a winding load or the like. That is, in the power mode 3, the high response characteristic is set with respect to the operation amount of the accelerator pedal 14 and hence, in case of a vehicle with a 3 litter engine, for example, a maximum torque is generated at a lower operation amount of the accelerator pedal 14 such that a potential of the 3 litter engine can be exercised at maximum. Here, driving force indication values (target torques) of the respective modes (normal mode 1, save mode 2, power mode 3) are, as described later, set based on 2 parameters consisting of an engine rotational speed and accelerator opening degree.

Figure 4:
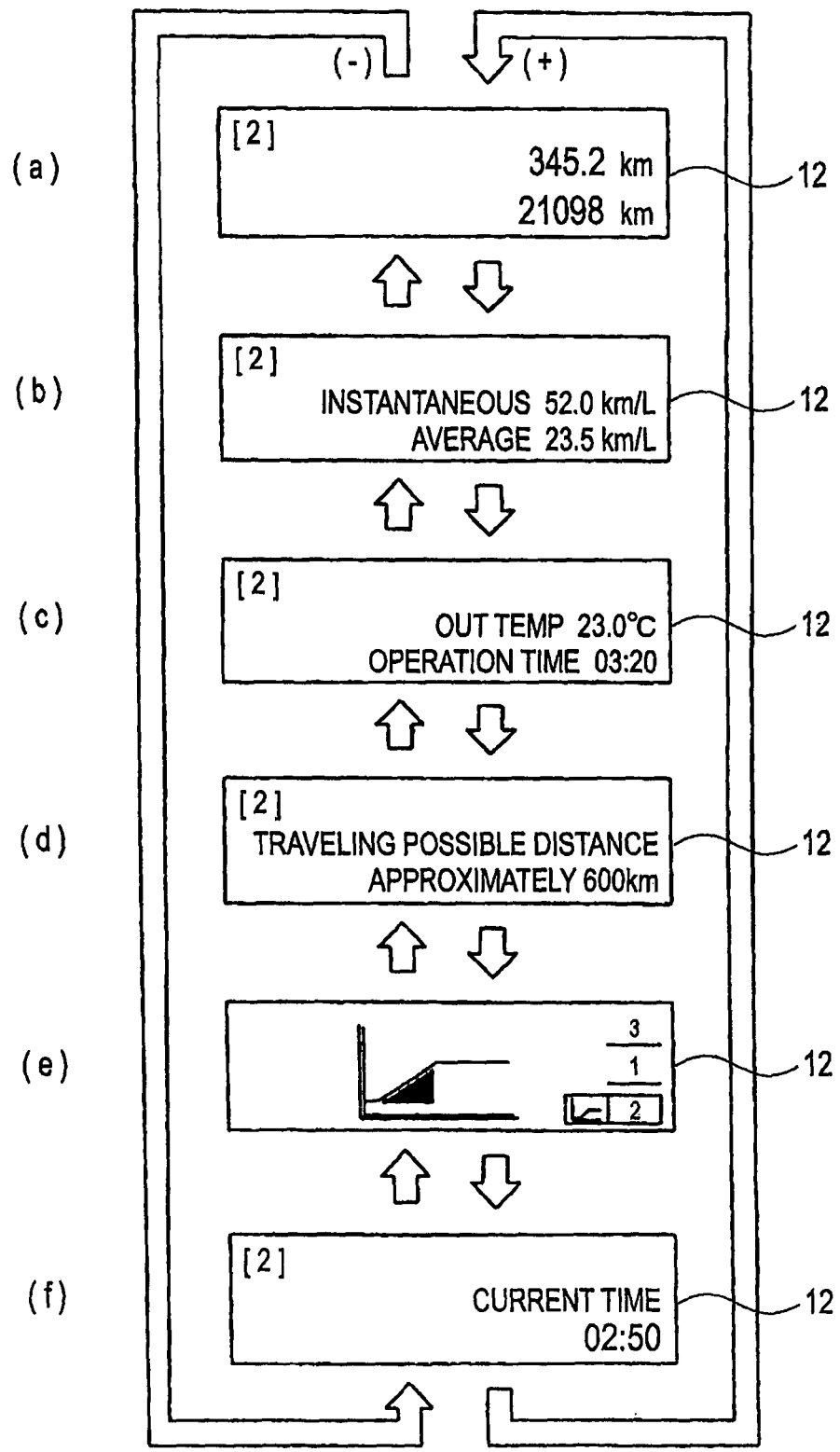
FIG. 4 is an explanatory view showing a display example of a multi-information display.

A display changeover switch 10 is manipulated to change over information displayed on a MID 12 and includes a forward feeding switch portion 10a, a reverse feeding switch portion 10b, and a reset switch portion 10c. FIG. 4 illustrates items for every images displayed on the MID 12 as an example. Here, the MID 12 may be a color display.

In this embodiment, 6 kinds of images (a) to (f) are set, wherein each time the forward feeding switch portion 10a is turned on, the images are changed over in order from (a) to (f). When the forward feeding switch portion 10a is turned on in a state that the image (f) is displayed, the initial image (a) is displayed. On the other hand, when the reverse feeding switch portion 10b is turned on, the image is changed over in the reverse direction.

The image (a) is an initial image which is displayed when the ignition switch is turned on. On the image (a), an odometer is displayed in a lower stage and a trip meter is displayed in an upper stage. Further, a current mode ("2" indicative of the save mode 2 in the drawing) is displayed at a left end of the image (a).

On the image (b), a mileage measured by the trip meter and a trip average fuel consumption [km/L] calculated based on a total fuel injection pulse width (pulse time) in the mileage are displayed in a lower stage, while a mileage during several seconds and an instantaneous fuel consumption [km/L] calculated based on the total fuel injection pulse width (pulse time) in the moment are displayed in an upper stage.

On the image (c), an operation time from a point of time that the engine is started is displayed in a lower stage and an outside temperature [° C.] is displayed in an upper stage.

On the image (d), an approximately traveling possible distance [Km] calculated based on residual fuel quantity in the inside of a fuel tank and the trip average fuel consumption is displayed.

On the image (e), an acceleration-torque line of the currently selected mode (the save mode 2 being indicated in the drawing) is displayed. In the acceleration-torque line, an output torque of the engine is taken on an axis of ordinates and the accelerator opening degree is taken on an axis of abscissas, and a power display region P is set in the inside of the displayed acceleration-torque line. In the power display region P, being interlocked with the increase or the decrease of the accelerator opening degree, the band showing the power level is linearly expanded or contracted in a transverse direction. Accordingly, by observing the displayed power level, the driver can easily grasp the current driving state.

The current time is displayed on the image (f).

Figure 5A:
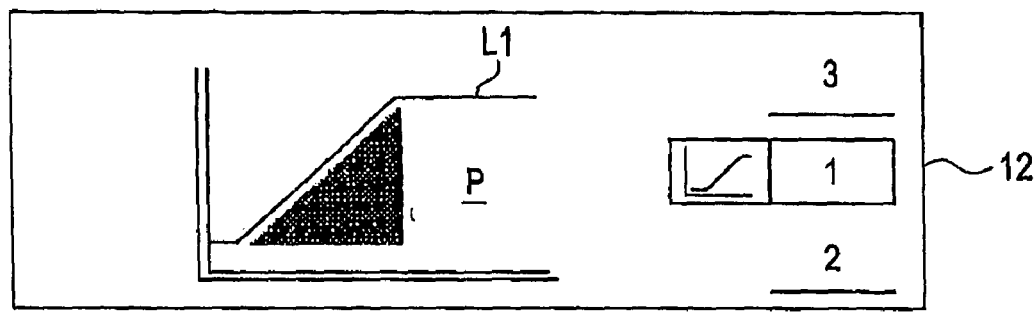
FIG. 5A to FIG. 5C are explanatory views showing a display example of the multi-information display at the time of changing over a mode.
Figure 5B:
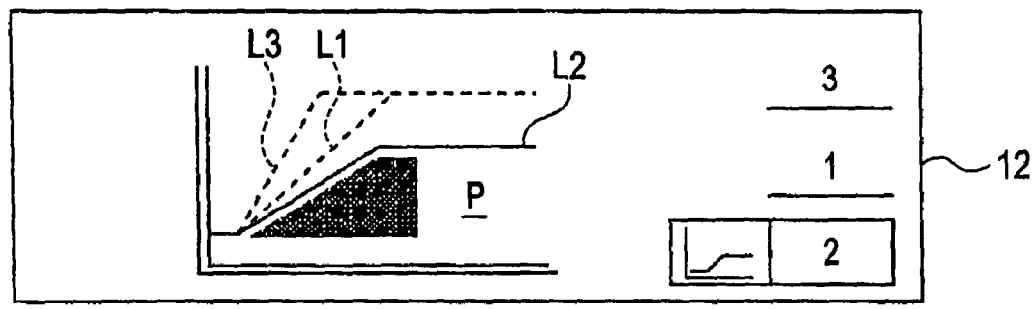
Figure 5C:
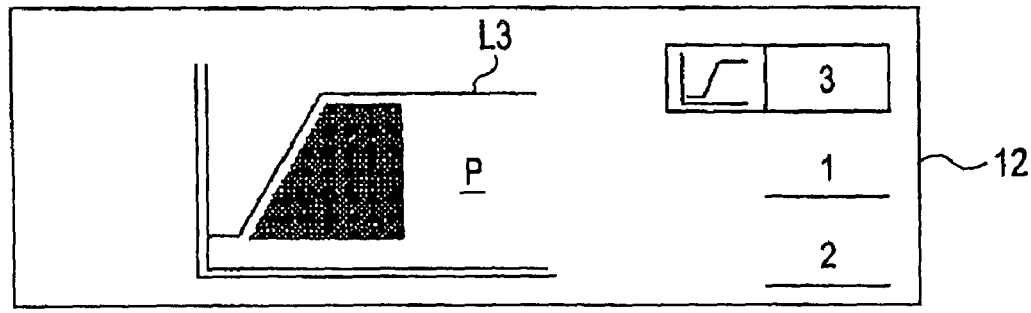

As shown in FIG. 5A to FIG. 5C, the above-mentioned acceleration-torque line displayed on the image (e) differs for every selected mode, that is, the normal mode 1, the save mode 2 or the power mode 3. FIG. 5A shows the acceleration-torque line L1 which constitutes a driving force characteristic line displayed when the normal mode 1 is selected. FIG. 5B shows the acceleration-torque line L2 which constitutes a driving force characteristic line displayed when the save mode 2 is selected. And FIG. 5C shows the acceleration-torque line L3 which constitutes a driving force characteristic line displayed when the power mode 3 is selected.

Here, the above-mentioned image (e) shown in FIG. 4 may be displayed on the MID 12 as an initial image when the ignition switch is turned on. In this case, immediately after the initial image is displayed, the respective acceleration-torque lines L1, L2, L3 are simultaneously displayed and, with a time delay, other acceleration-torque lines may be faded out while leaving only the acceleration-torque line corresponding to the currently set mode.

In FIG. 5B, to compare the driving force characteristics of the acceleration-torque lines L1, L2, L3 for respective modes, the acceleration-torque lines L1, L3 are indicated by a broken line in an overlapped manner. Here, these acceleration-torque lines L1, L3 are indicated for the conveniences sake and are not displayed in an actual operation. As shown in FIG. 5B, the power mode 3 possesses the characteristic which exhibits a larger throttle change quantity in response to a step-on operation of the accelerator pedal. Here, a larger target torque is set with respect to the accelerator opening degree. The normal mode 1 is set to possess the characteristic where the throttle opening is linearly arranged with respect to the operation amount of the accelerator pedal. Compared to the driving force characteristic of the power mode 3, the normal mode 1 possesses the characteristic which exhibits the relatively small throttle change quantity in response to the step-on operation of the accelerator pedal. That is, the normal mode 1 is set to acquire the favorable driving performance in a usual driving region where the accelerator opening degree is relatively small.

Further, the save mode 2 is set such that the driver can enjoy the acceleration work with the smooth output characteristic while ensuring a sufficient output.

Here, the content displayed in FIG. 5A to FIG. 5C (the image shown in FIG. 4(e)) may be always displayed on an information display which is separately provided in the inside of the tachometer 3a. Alternatively, only the display content shown in FIG. 5A to FIG. 5C is displayed on the MID 12 and other display contents shown in FIG. 4 may be displayed on an information display which is additionally provided.

Further, in the fuel consumption meter 13, a neutral position indicates the trip average fuel consumption [Km/L]. When the instantaneous fuel consumption [Km/L] is higher than the trip average fuel consumption [Km/L], a pointer 13a is swung in the plus (+) direction in response to the deviation, while when the instantaneous fuel consumption [Km/L] is lower than the trip average fuel consumption [Km/L], the pointer 13a is swung in the minus (−) direction in response to the deviation.

Figure 6:
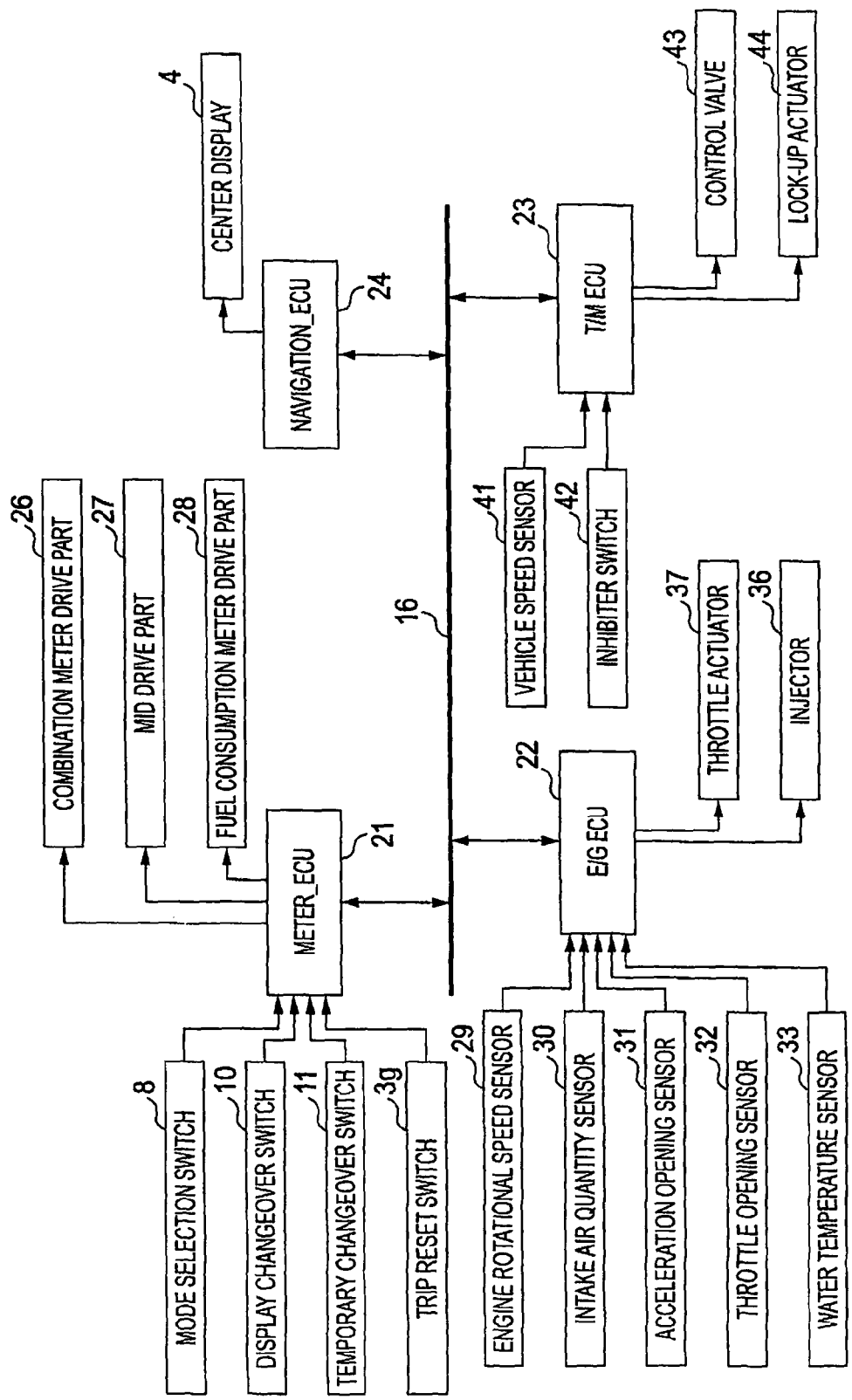
FIG. 6 is a constitutional view of a driving force control unit.

Here, as shown in FIG. 6, to the vehicle, through an interior communication circuit 16 such as a CAN (Controller Area Network) communication, control devices which constitutes arithmetic operation means for controlling the vehicle such as a meter control device (meter_ECU) 21, an engine control device (E/G_ECU) 22, a transmission control device (T/M_ECU) 23, a navigation control device (navigation_ECU) 24 are connected in an intercommunicable manner. Each one of the ECU 21 to 24 is mainly constituted of a computer such as a microcomputer and includes well-known CPU, ROM, RAM and a non-volatile memory means such as EEPROM.

The meter_ECU 21 is provided for controlling the whole display of the combination meter 3. Here, the mode selection switch 8, the display changeover switch 10, a temporary changeover switch 11 and the trip reset switch 3g are connected to an input side of the meter_ECU 21, while instruments such as the tachometer 3a, the speed meter 3b, the water temperature meter 3c, the fuel meter 3d, a combination meter drive part 26 which drives the warning lamp 3f, an MID drive part 27, and a fuel meter drive part 28 are connected to an output side of the meter_ECU 21.

The E/G_ECU 22 is provided for controlling an operation state of the engine. To an input side of the E/G_ECU 22, a group of sensors which detect the vehicle and engine operation states such as an engine rotational speed sensor 29 which constitutes an operation state detection means for detecting an engine rotational speed which is a typical example of parameters indicating the engine operation state based on a rotation of a crankshaft or the like, an intake air quantity sensor 30 which is arranged immediately downstream of an air cleaner or the like and detects the intake air quantity, an accelerator opening sensor 31 which constitutes an accelerator opening detection means for detecting accelerator opening degree of the accelerator pedal 14, a throttle opening sensor 32 which is interposed in an intake passage and detects opening of a throttle valve (not shown in the drawing) for adjusting an intake air quantity supplied to respective cylinders of the engine, a water temperature sensor 33 which constitutes an engine temperature detection means for detecting cooling water temperature indicative of an engine temperature are connected. Further, to an output side of the E/G_ECU 22, a group of actuators which controls the driving of the engine such as an injector 36 which injects a predetermined measured fuel to a combustion chamber, a throttle actuator 37 which is mounted in an electronic throttle control device (not shown in the drawing) are connected.

The E/G_ECU 22 sets fuel injection timing and a fuel injection pulse width (pulse time) with respect to the injector 36 based on inputted detection signals from the respective sensors. Further, E/G_ECU 22 outputs the throttle driving signal to the throttle actuator 37 which drives the throttle valve thus controlling the opening of the throttle valve.

Figure 11A:
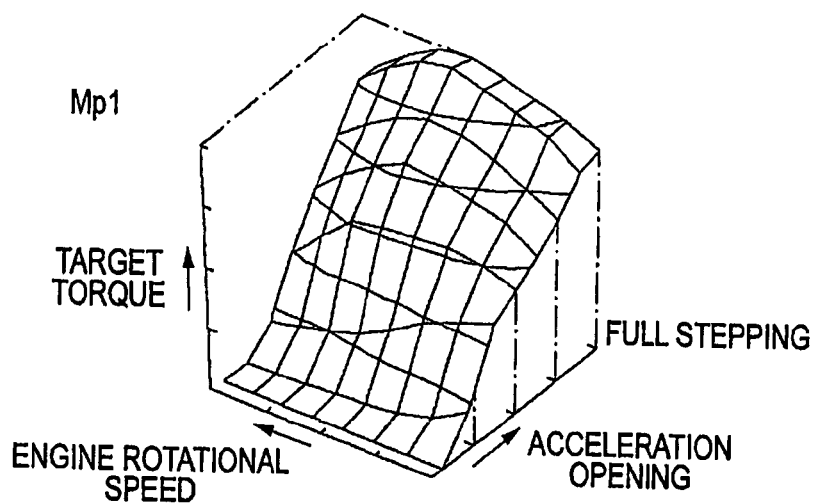
FIG. 11A is a conceptual view of a normal mode map.
Figure 11B:
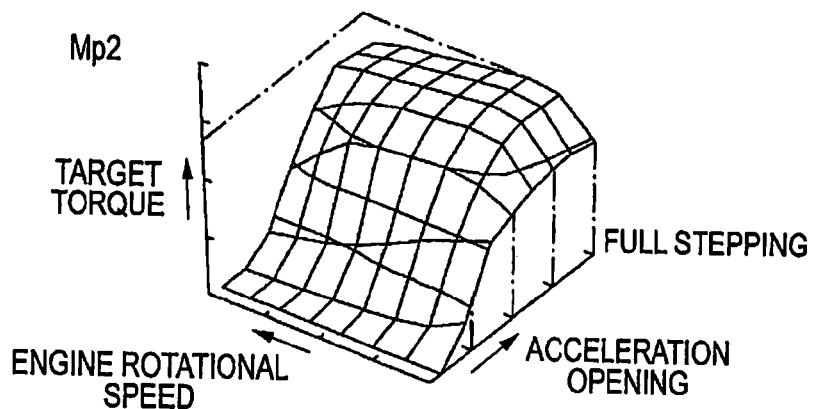
FIG. 11B is a conceptual view of a save mode map.
Figure 11C:
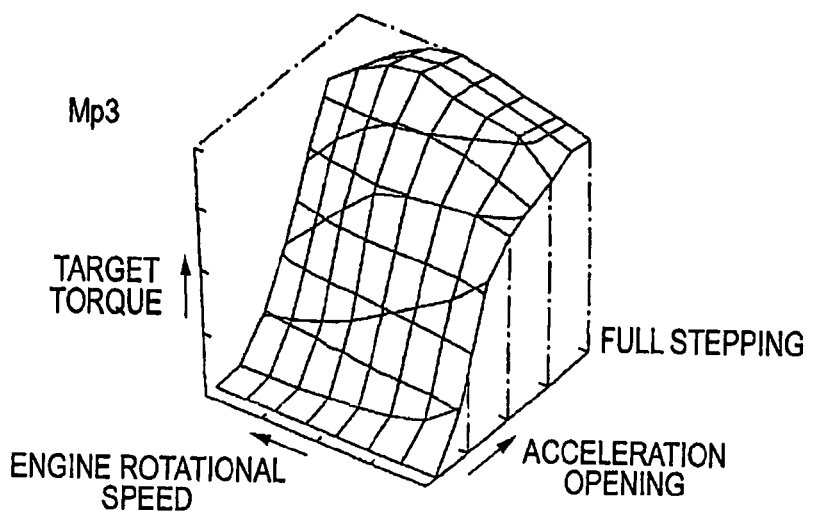
FIG. 11C is a conceptual view of a power mode map.

Here, in the volatile memory means which is provided to the E/G_ECU 22 and constitutes a portion of the driving force setting means, a plurality of different driving force characteristics is stored in a map form. As the respective driving force characteristics, in this embodiment, three kinds of mode maps Mp1, Mp2, Mp3 are provided. As shown in FIG. 11A to FIG. 11C, the respective mode maps Mp1, Mp2, Mp3 are configured as a three-dimensional map in which the accelerator opening degree and the engine rotational speed are taken on matrix axes, and driving force indication values (target torques) are stored in respective matrix points.

The respective mode maps Mp1, Mp2, Mp3 are basically selected by the manipulation of the mode selection switch 8. That is, when the normal mode 1 is selected by the mode selection switch 8, the normal mode map Mp1 which constitutes the first mode map is selected. When the save mode 2 is selected by the mode selection switch 8, the save mode map Mp2 which constitutes the second mode map is selected. Further, when the power mode 3 is selected by the mode selection switch 8, the power mode map Mp3 which constitutes the third mode map is selected.

Hereinafter, the driving force characteristics of the respective mode maps Mp1, Mp2, Mp3 are explained. The normal mode map Mp1 shown in FIG. 11A is set to exhibit the characteristic in which the target torque is linearly changed in a region where the accelerator opening degree is relatively small, and the maximum target torque is obtained when the opening of the throttle valve is close to a wide-open throttle.

Further, in the save mode map Mp2 shown in FIG. 11B, compared to the above-mentioned normal mode map Mp1, the elevation of the target torque is suppressed and hence, the driver can enjoy the acceleration work by widely using the stroke of the accelerator pedal 14. Further, since the elevation of the target torque is suppressed, it is possible to achieve both of the easy drive ability and the low fuel consumption in a well balanced manner. For example, in case of a vehicle with a 3 litter engine, the smooth output characteristic is obtained while ensuring a sufficient output corresponding to the 2 litter engine. Particularly, the target torque is set to achieve easy-to-drive performance in a practical-use region such as traveling in towns.

Further, in the power mode map Mp3 shown in FIG. 11C, a change rate of the target torque in response to the change of the accelerator opening degree is largely set in the substantially all driving region. Accordingly, for example, in case of a vehicle with a 3 litter engine, the target torque is arranged to maximize potential of the 3 litter engine. Here, the substantially same driving force characteristic is set in a low speed region including an idling rotational speed in the respective mode maps Mp1, Mp2, Mp3.

In this manner, according to this embodiment, when any one of the modes 1, 2, 3 is selected in response to the manipulation of the mode selection switch 8 by the driver, the corresponding mode map Mp1, Mp2 or Mp3 is selected, and the target torque is set based on the mode map Mp1, Mp2 or Mp3 and hence, the driver can enjoy three kinds of acceleration responses which differ completely from each other using one vehicle.

Here, an open/close speed of the throttle valve is also set such that the throttle valve is operated gently in the mode map Mp2 and is rapidly operated in the mode map Mp3.

Further, the T/M_ECU 23 is provided for performing the gear change control of the automatic transmission. To an input side of the T/M_ECU 23, a vehicle speed sensor 41 which detects a vehicle speed based on a rotational speed of a transmission output shaft or the like, an inhibiter switch 42 which detects a range in which the selection lever 7 is positioned are connected, while to an output side of the T/M_ECU 23, a control valve 43 which performs the gear change control of the automatic transmission and a lock-up actuator 44 which performs a lock-up operation of a lock-up clutch are connected. The T/M_ECU 23 determines the range of the selection lever 7 in response to a signal from the inhibitor switch 42. When the selection lever 7 is positioned in a D range, the T/M_ECU 23 performs the change gear control by outputting a change gear signal to the control valve 43 in accordance with a predetermined transmission pattern. Here, the transmission pattern is variably set corresponding to the modes 1, 2, 3 set in the E/G_ECU 22.

Further, when the lock-up condition is satisfied, a slip lock-up signal or a lock-up signal is outputted to the loch-up actuator 44 so as to changeover the relationship between input/output elements of a torque converter into a slip lock-up state or a lock-up state from a converter state. Here, the E/G_ECU 22 corrects the target torque $\tau e$ when the state of the torque converter is changed to a slip lock-up state or a lock-up state. As a result, for example, when the mode M is set to the save mode 2, the target torque $\tau e$ is corrected to the one which allows more fuel efficient traveling.

The navigation_ECU 24 is mounted in a well-known car navigation system, and detects a position of the vehicle based on positional data obtained from a GPS satellite or the like and, at the same time, calculates a guide route to the destination. Further, the navigation_ECU 24 displays the present position and the guide route of the own car as the map data on the center display 4. In this embodiment, the navigation_ECU 24 can display various information to be displayed on the MID 12 on the center display 4.

Next, steps for controlling the operation state of the engine executed by the above-mentioned E/G_ECU 22 is explained in accordance with flowcharts shown in FIG. 7 to FIG. 10.

Figure 7:
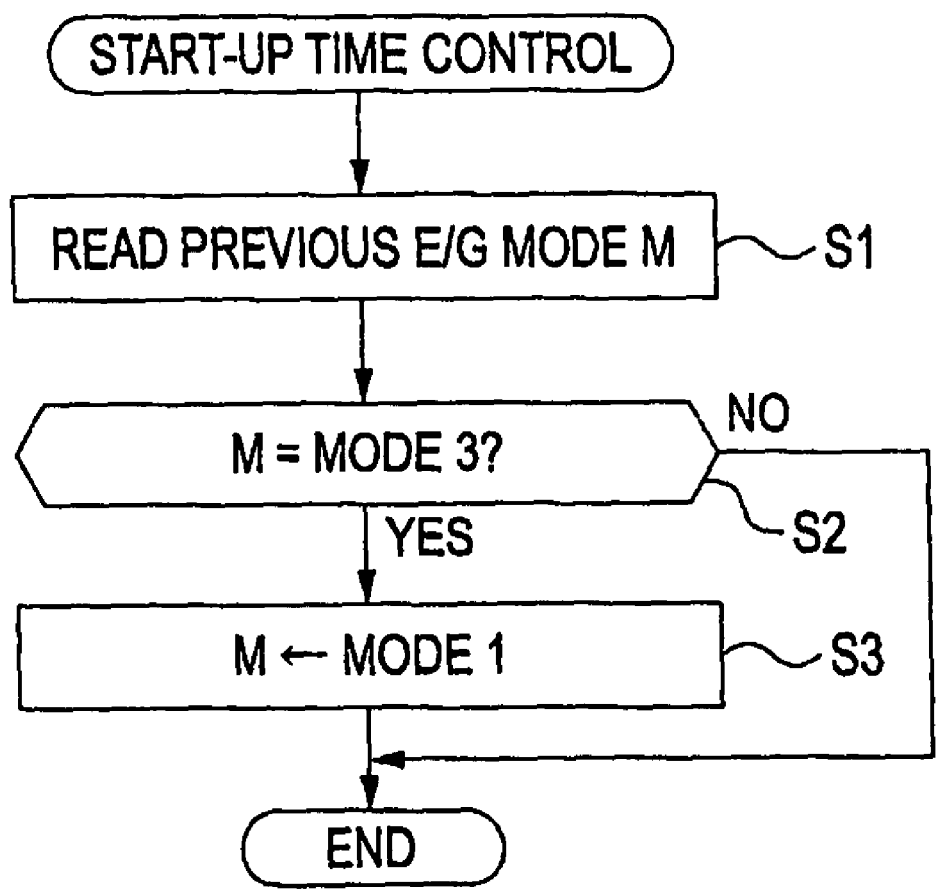
FIG. 7 is a flowchart showing a starting time control routine.

When the ignition switch is turned on, first of all, the start-up time control routine shown in FIG. 7 is initiated only one time. In this routine, first of all, in step S1, the mode M (M: normal mode 1, save mode 2, power mode 3) stored the last time the ignition switch was turned off is read.

Then, the processing advances to step S2, and it is determined whether the mode M is the power mode 3 or not. When the mode M is the power mode 3, the mode M is forcibly set to the normal mode 1 (M←mode 1) and the routine is finished.

Further, when the mode M is the mode other than the power mode 3, that is, the normal mode 1 or the save mode 2, the routine is finished as it is.

In this manner, when the mode M stored the last time the ignition switch was turned off is the power mode 3, the mode M at the time of turning on the ignition switch is forcibly changed to the normal mode 1 (M←mode 1), hence there is no possibility that the vehicle starts rapidly and, thus, the vehicle can obtain the favorable start performance even when the accelerator pedal 14 is slightly depressed.

Figure 8:
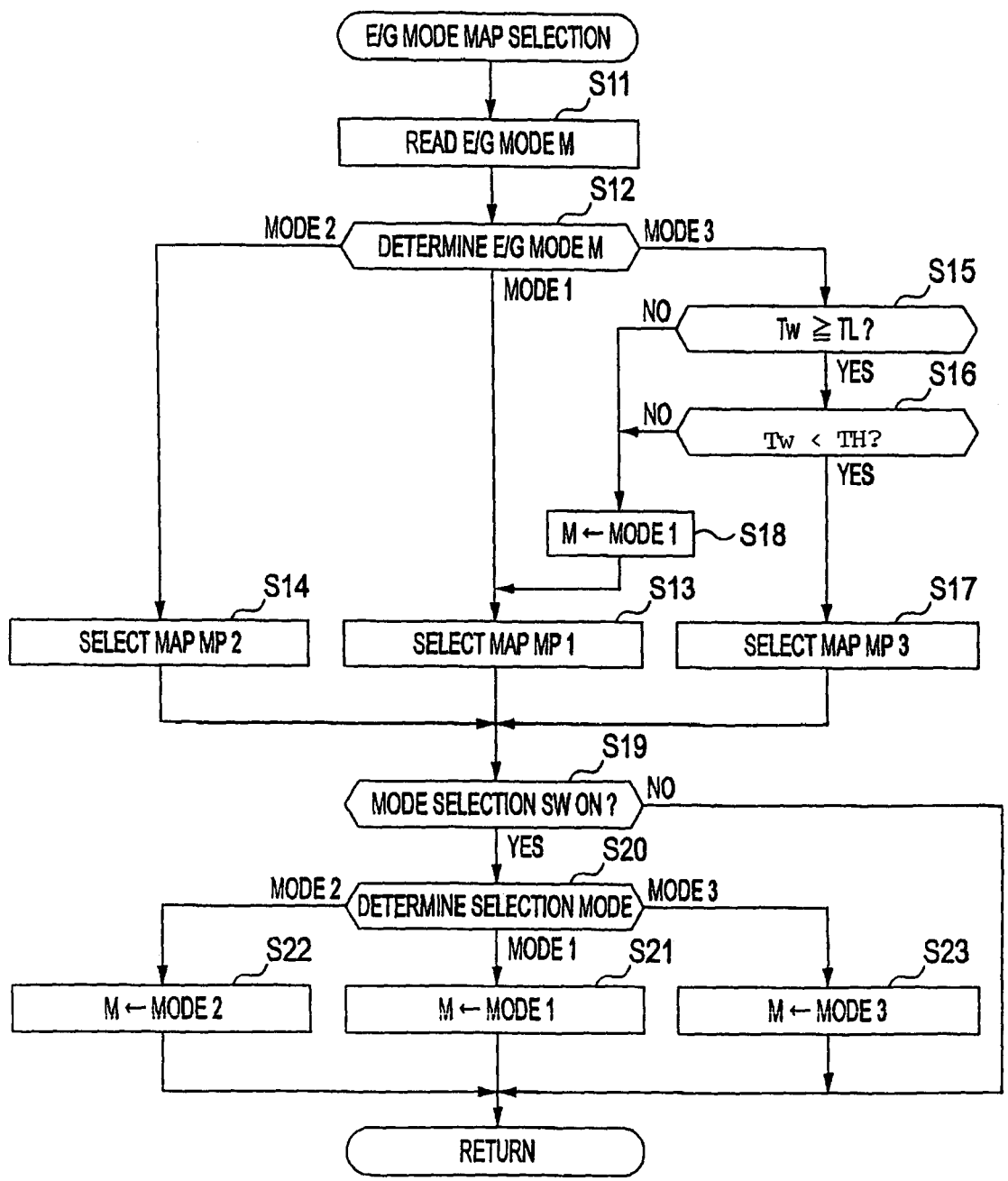
FIG. 8 is a flowchart showing a mode map selection routine.
Figure 9:
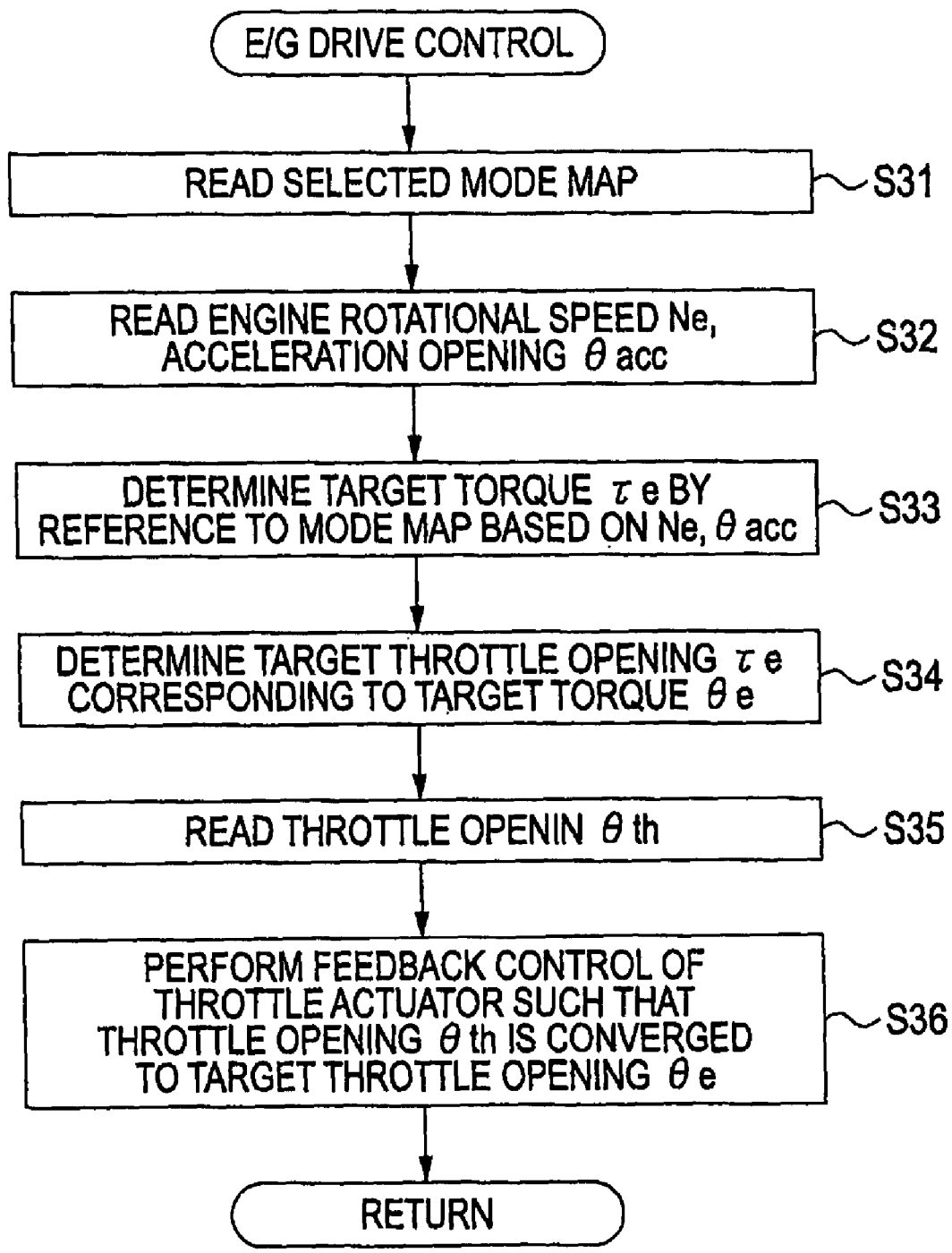
FIG. 9 is a flowchart showing an engine control routine.
Figure 10:
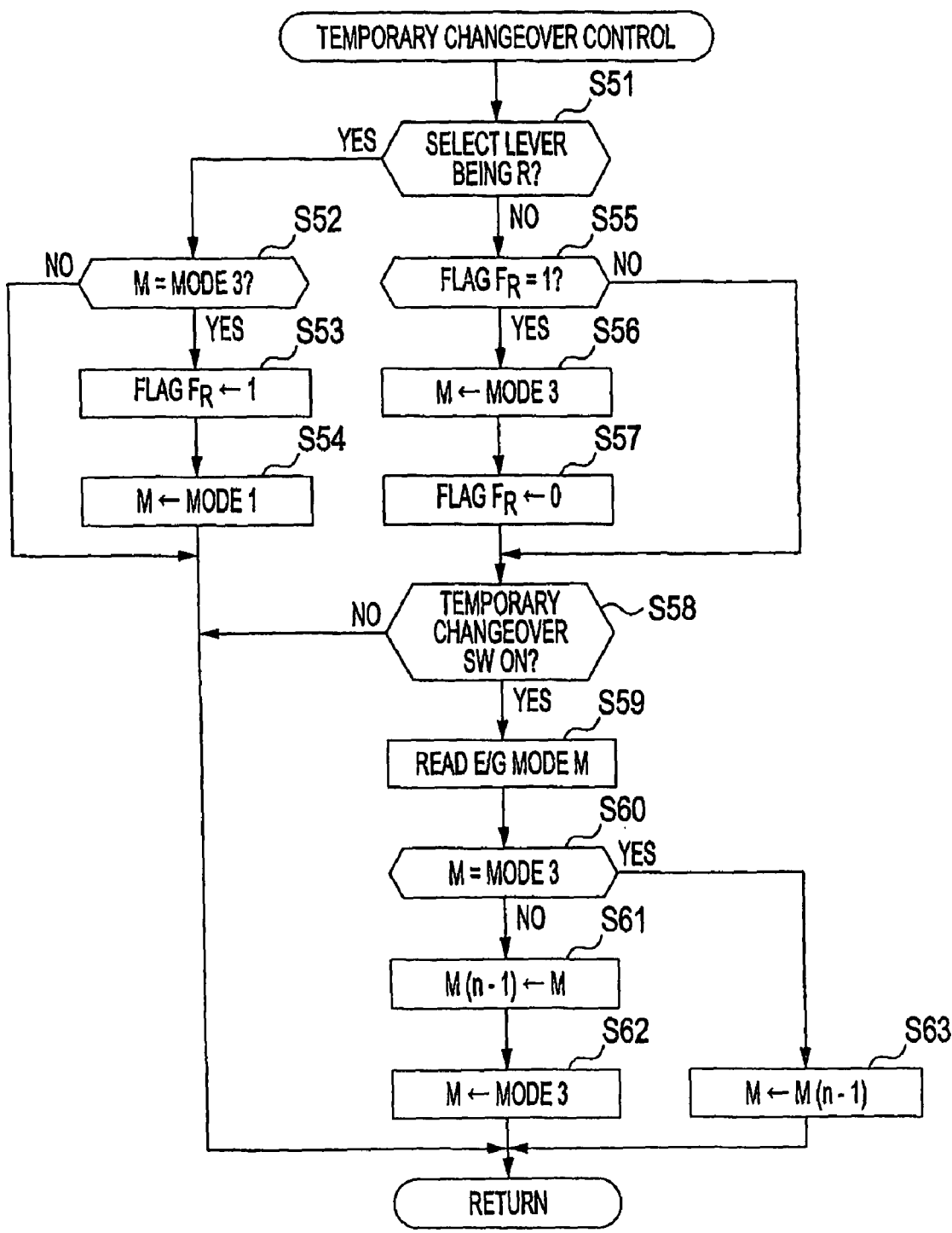
FIG. 10 is a flowchart showing a temporary changeover control routine.

Then, when this start-up time control routine is finished, the routines shown in FIG. 8 to FIG. 10 are executed for every predetermined calculation cycle. First of all, the mode map selection routine shown in FIG. 8 is explained.

In this routine, first of all, the currently set mode M is read in step S11, and it is determined which mode (normal mode 1, save mode 2 or power mode 3) is set by reference to the number of the mode M in step S12. Then, when set is the normal mode 1, the processing advances to step S13. When set is the save mode 2, the processing is branched to step S14. Further, when set is the power mode 3, the processing is branched to step S15. Here, at the time of executing the first routine after the ignition switch is turned on, the mode M is either one of the normal mode 1 or the save mode 2 and hence, the processing is not branched in step S15. However, when the driver rotates the manipulation knob 8a of the mode selection switch 8 in the right direction after the ignition switch is turned on to select the power S# mode, the mode M is set to the power mode 3 in step S23 described later and hence, the processing is branched to step S15 from step S12 at the time of executing succeeding routine.

Then, when it is determined that the mode M is set to the normal mode 1 and the processing advances to step S13, the normal mode map Mp1 stored in the non-volatile memory means of the E/G_ECU 22 is set as the mode map of this time and the processing advances to step S19. Further, when it is determined that the mode M is set to the save mode 2 and the processing advances to step S14, the save mode map Mp2 is set as the mode map of this time and the processing advances to step S19.

On the other hand, when it is determined that the mode M is set to the power mode 3 and the processing is branched to step S15, in steps S15 and S16, a cooling water temperature Tw detected by the water temperature sensor 33 as the engine temperature is compared with a predetermined lower temperature as a warm-up determination temperature TL and a predetermined upper temperature as an over heat determination temperature TH. Then, when it is determined that the cooling water temperature Tw is equal to or above the warm-up determination temperature TL (Tw≧TL) in step S15 and when it is determined that the cooling water temperature Tw is below the over heat determination temperature TH (Tw<TH) in step S16, the processing advances to step S17.

On the other hand, when it is determined that the cooling water temperature Tw is below the warm-up determination temperature TL (Tw<TH) in step S15 or when it is determined that the cooling water temperature Tw is equal to or above the over heat determination temperature TH (Tw>TH) in step S16, the processing is branched to step S18 and the mode M is set to normal mode 1 (M←mode 1) and the processing returns to step S13.

In this manner, according to this embodiment, even when the driver manipulates the mode selection switch 8 to select the power mode 3 after the ignition switch is turned on, the mode M is forcibly made to return to the normal mode 1 in the event that the cooling water temperature Tw is equal to or below the warm-up determination temperature TL or equal to or above the over heat determination temperature TH. Accordingly, a discharge quantity of exhaust emission can be suppressed at the time of engine warm-up, and the engine and its peripheral equipment can be protected from a heat defect by suppressing the output at the time of over heat. Here, when the mode M is forcibly made to return to the normal mode 1, the warning lamp 3f is turned on or blinked to inform the driver that the mode M is forcibly made to return to the normal mode 1. In this case, the return of the mode M to the normal mode 1 may be notified by a buzzer or sounds.

Next, when the processing advances to step S19 from any one of steps S13, S14 and S17, it is determined whether the mode selection switch 8 is manipulated or not. When it is determined that the manipulation of the mode selection switch 8 is not performed, the routine is finished. Further, when it is determined that the manipulation of the mode selection switch 8 is performed, the processing advances to step S20 and it is determined which mode is selected by the driver.

Then, when it is determined that the driver selects the normal mode (the knob 8a being rotated in the left direction), the processing advances to step S21 to set the mode M to the normal mode 1 (M←mode 1), and the routine is finished.

Further, when it is determined that the driver selects the save mode 2 (the knob 8a being pushed) (M←mode 2), the processing advances to step S22 to set the mode M to the save mode 2 (M←mode 2), and the routine is finished. Further, when it is determined that the driver selects the power mode 3 (the knob 8a being rotated in the right direction), the processing advances to step S23 to set mode M to the power mode 3 (M←mode 3), and the routine is finished.

In this manner, in this embodiment, the E/G_ECU 22 functions as the mode selection control means.

In this embodiment, the mode M can be set to the power mode 3 by manipulating the knob 8a of the mode selection switch 8 after turning on the ignition switch and hence, it is also possible to start the vehicle with the power mode 3. In this case, the driver consciously selects the power mode and hence, the driver would not be frightened at the large driving force generated at the start.

Next, an engine control routine shown in FIG. 9 is explained.

In this routine, first of all, in step S31, the currently selected mode map (Mp1, Mp2 or Mp3: see FIG. 11) is read and, subsequently, in step S32, an engine rotational speed Ne detected by the engine rotational sensor 29 and accelerator opening degree θacc detected by the accelerator opening sensor 31 are read.

Then, the processing advances to step S33 in which a target torque τe which constitutes a driving force indication value is determined based on both parameters Ne and θacc by reference to the mode map read in step S31 with the interpolation calculation.

Next, the processing advances to step S34 in which a target throttle opening θe corresponding to the target torque τe is determined as a final driving force indication value.

Then, the processing advances to step S35 in which a throttle opening θth detected by the throttle opening sensor 32 is read. In step S36, a feedback control is applied to the throttle actuator 37 which performs an open/close operation of the throttle valve mounted in the electronic throttle control device such that the throttle opening θth is converged to the target throttle opening θe. Then, the routine is finished.

As a result, when the driver manipulates the accelerator pedal 14, the throttle valve is opened or closed in accordance with the mode maps Mp1, Mp2 and Mp3 corresponding to the mode M (M: normal mode 1, save mode 2, power mode 3) selected by the driver, using the accelerator opening degree θacc and the engine rotational speed Ne as parameters. When the mode M is set to the normal mode 1, an output torque is preset approximately linearly with respect to an operation amount of the accelerator pedal (accelerator opening degree θacc) and hence, the normal driving can be performed.

Further, when the mode M is set to the save mode 2, the elevation of the target torque is suppressed and hence, the driver can enjoy the acceleration work by widely using the stroke of the accelerator pedal 14 and, at the same time, it is possible to acquire both of easy drive ability and low fuel consumption in a well-balanced manner. Accordingly, even in case of a vehicle with a 3 litter engine, the smooth driving can be performed while ensuring a sufficient output corresponding to the 2 litter engine and hence, the vehicle can obtain the favorable driving performance in a practical-use region such as towns and the cities.

Further, when the mode M is set to the power mode 3, a high acceleration response is obtained and hence, the vehicle can perform more sporty traveling.

As a result, the driver can enjoy three kinds of acceleration responses which completely differ from each other with one vehicle. Accordingly, the driver can arbitrarily select the preferred driving force characteristic even after purchasing the vehicle and can drive the vehicles corresponding to three vehicles having different characteristics with one vehicle.

Further, in this embodiment, when the temporary changeover switch 11 which is mounted on the steering wheel 9 is manipulated or the selection lever 7 is positioned to the R range, the mode M is temporarily changed over. This temporarily changeover control is executed in accordance with a temporarily changeover control routine shown in FIG. 10.

In this routine, first of all, it is determined whether the selection lever 7 is positioned to the R range or not based on a signal from the inhibitor switch 42 in step S51. When it is determined that the selection lever 7 is positioned to the R range, the processing advances to step S52, while when the selection lever 7 is positioned to a range other than the R range, the processing advances to step S55.

When the processing advances to step S52, the current mode M is referred and the routine is finished except for a state in which the mode M is set to the power mode 3. Further, when the mode M is set to the power mode 3, the processing advances to step S53 to set a reverse flag FR (FR←1) and the processing advances to step S54 to set the mode M to the normal mode 1 (M←mode 1) and the routine is finished.

In this manner, according to this embodiment, when the selection lever 7 is moved to the R range in a state that the mode M is set to the power mode 3, the mode M is forcibly changed over to the normal mode 1 and hence, even when the accelerator pedal 14 is depressed slightly at driving the vehicle backward, there is no possibility that the vehicle suddenly travels backward thus acquiring the favorable backward travel performance.

On the other hand, when it is determined that the selection lever 7 is positioned to the range other than the R range in step S51 and the processing advances to step S55, the reverse flag FR is referred. When the reverse flag FR is 1 (FR=1), that is, in the first routine after the selection lever 7 is changed over to another range from the R range, the processing advances to step S56 in which the mode M is made to return to the power mode 3 (M←mode 3). Then the processing advances to step S57 in which the reverse flag FR is cleared (FR←0) and the processing advances to step S58.

As a result, in a state that after the mode M is forcibly changed over to the normal mode 1 from the power mode 3 because of the manipulation of the selection lever 7 to the R range, the selection lever 7 is moved to the D range, for example, the mode M is made to automatically return to the initial power mode 3 and hence, the driver can start the vehicle without feeling a discomfort.

Further, when it is determined that the reverse flag FR is 0 (FR=0) in step S55, the processing jumps to step S58.

Then, when the processing advances to step S58 from step S55 or step S57, it is determined whether the temporary changeover switch 11 is turned on or not. Then, when it is determined that the temporary changeover switch 11 is not turned on, the routine is finished as it is.

On the other hand, when it is determined that the temporary changeover switch 11 is turned on, the processing advances to step S59 to read the current mode M, and in step S60, it is determined whether the mode M is set to the power mode 3 or not.

Then, when it is determined that the mode M is set to a mode (normal mode 1 or save mode 2) other than the power mode 3, the processing advances to step S61 in which the mode M at the time the temporary changeover switch 11 is turned on is stored as a previous mode M(n−1)(M(n−1)←M) and the processing advances to step S62. In step S62, the current mode M is set to the power mode 3 (M←mode 3) and the routine is finished.

In this manner, according to this embodiment, even when the mode M is set to the normal mode 1 or the save mode 2 using the mode selection switch 8, the mode M can be changed over to the power mode 3 by turning on the driver's-side temporary changeover switch 11. As a result, in traveling an ascending slope which requires power, the mode M can be easily changed over to the power mode 3 from the normal mode 1 or the save mode 2 temporarily and hence, the vehicle can acquire the favorable traveling performance. Further, the temporary changeover switch 11 is mounted on the steering wheel 9 and hence, the driver can easily change over the mode M without leaving his/her hand from the steering wheel 9 thus improving the manipulability.

Further, when it is determined that the current mode M is set to the power mode 3 in step S60, the processing is branched to the step S63 in which the previous mode M(n−1) is read to be the current mode M (M+M(n−1)) and the routine is finished.

As a result, by manipulating the temporary changeover switch 11 again after the mode M is temporarily changed over to the power mode 3, the mode M is made to return to the initial mode M (normal mode 1 or save mode 2).

Second Embodiment

Figure 12:
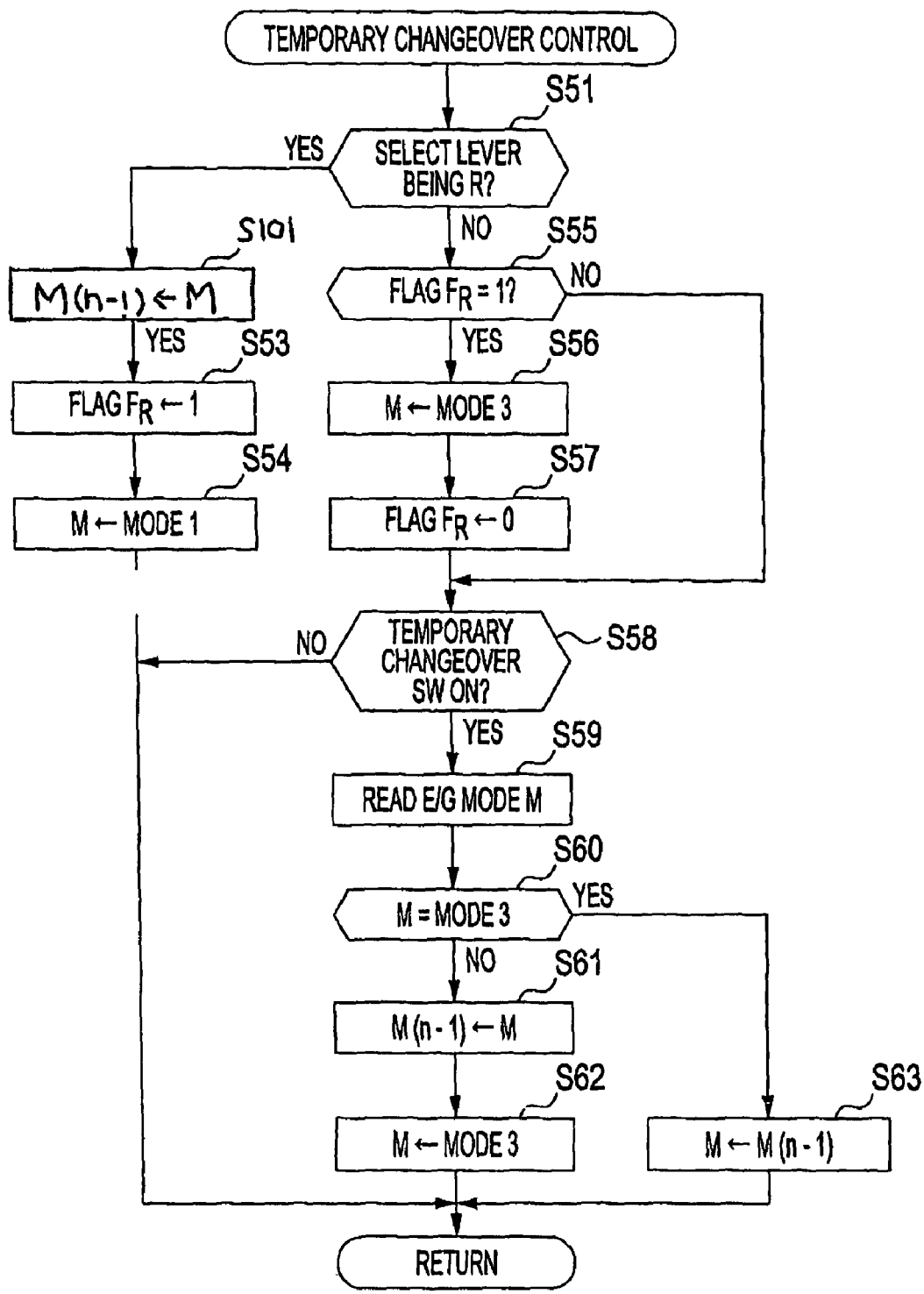
FIG. 12 is flowchart showing a temporary changeover control routine.

FIG. 12 is a flowchart showing temporary changeover control routine as a second embodiment. This flowchart is used instead of FIG. 10 in a first embodiment. Therefore, the same structure as the first embodiment, and the same processing as FIG. 10 are given the same number and explanation are omitted.

In the first embodiment, when the shift lever 7 is positioned in R range, the mode M is changed over to the normal mode 1 when only the power mode 3 is selected. In the second embodiment, when the shift lever 7 is positioned in R range, the normal mode 1 is only selected as the mode M.

That is, in the step 51, shift lever 7 is judged as positioned in R range, the processing advanced to S101. In the step 101 the current mode M is stored as previous mode (M(n−1)←M). And the processing advanced to S54 through S53, the mode M is set to normal mode 1, and quits the routine.

The second embodiment enables the driver to feel the same accelerator feeling at all times. That is, accelerator operation feeling is more constant than the first embodiment so that better manipulation feeling can be obtained.

Furthermore, then shift lever 7 is changed over to another range from R range, the mode M is automatically changed over to the previous mode M(n−1), the driver can drive the vehicle as the same mode as previous mode which is selected before reverse traveling without uncomfortable feeling.

In the second embodiment, the mode M is changed over to the normal mode 1 when the shift lever 7 is positioned in R range, however, the normal mode 1 can be changed to the save mode 2 when the shift lever 7 is positioned in R range.

The invention is not limited to the above-mentioned embodiment. For example, two kinds or four kinds or more of mode maps which differ in driving force characteristics from each other may be set. By setting the mode maps in this manner, the driver can drive the vehicle corresponding to two or four or more vehicles having different driving force characteristics with one vehicle. Further, the driving force characteristic of the mode map may be changed corresponding to liking of the driver.

Further, in this embodiment, the case in which the target torque is set using the plurality of mode maps having the plurality of different driving force characteristics based on the accelerator opening and the engine rotational speed is exemplified. However, the invention is not limited to such a case and the target torques of the respective driving force characteristics may be obtained by calculation based on the accelerator opening and the engine rotational speed.

Further, in this embodiment, the explanation is made using the throttle actuator 37 which drives the throttle valve mounted on the electron control throttle device as a controlling object. However, the controlling object is not limited to the throttle actuator 37. For example, in the diesel engine, an injector drive device may be set as the controlling object and an injection quantity of fuel injected from the injector drive device may be set based on a target torque τe.

Further, in an engine which performs an open/close operation of an intake valve using a solenoid valve mechanism, the solenoid valve mechanism may be set as the controlling object and the valve opening of the intake valve which is driven by the solenoid valve mechanism may be set based on the target torque τe.

Furthermore, in these embodiments, the shuttle switch with automatically reset to the neutral point is used as the mode select switch 8. However, another type switches such as multiple switch can be used. In this case, the push switch is arranged in the middle of the switch and other push switches which are smaller height than the push switch are arranged around the push switch. In the ON manipulation of the push switch, the save mode 2 can be selected. By this structure, multiple switch which has over 4 multiple switch can be easily arranged.

What is claimed is:

1. An engine control apparatus for a vehicle comprising:
   a plurality of control modes including at least a first mode having engine output characteristics suitable for normal driving, a second mode having engine output characteristics in which power is suppressed, and a third mode having engine output characteristics in which power is prioritized;
   a selector for selecting one control mode from said plurality of control modes by external manipulation;
   a driving force setting unit for setting a target torque according to said engine output characteristics corresponding to the selected mode based on said vehicle driving condition; and
   a shift lever position detector for detecting a shift lever position of a transmission;
   wherein said driving force setting unit changes said control mode to one control mode selected from said plurality of control modes except for the third mode when said shift lever is detected in a position of a reverse range by the shift lever position detector, and sets said target torque according to said engine output characteristics corresponding to the changed mode based on the vehicle driving condition.

2. The engine control apparatus for a vehicle according to claim 1, wherein said driving force setting unit changes the control mode selected by said selector, when said shift lever is changed from reverse range to other ranges.

3. The engine control apparatus for a vehicle according to claim 1, wherein said driving force setting unit changes the control mode to said first mode, when said shift lever is detected in the position of the reverse range by said shift lever position detector.

4. The engine control apparatus for a vehicle according to claim 1, wherein said driving force setting unit changes the control mode to said first mode, when said shift lever is detected in the position of the reverse range by the shift lever position detector and said third mode is selected as the control mode.

* * * * *